United States Patent [19]
Voight et al.

[11] Patent Number: 4,603,307
[45] Date of Patent: Jul. 29, 1986

[54] INVERTER USING CURRENT STEERING SATURABLE INDUCTORS OR DIODES

[75] Inventors: William C. Voight, San Francisco; Arthur B. Odell, Mountain View, both of Calif.

[73] Assignee: Boschert, Inc., Milpitas, Calif.

[21] Appl. No.: 700,782

[22] Filed: Feb. 12, 1985

[51] Int. Cl.$^4$ .................. H03K 3/281; H02M 3/335
[52] U.S. Cl. .................. 331/113 A; 363/22; 363/133
[58] Field of Search .............. 331/113 A, 113 S, 151; 363/22, 23, 24, 25, 26, 133, 134, 139

[56] References Cited

U.S. PATENT DOCUMENTS

| | | | |
|---|---|---|---|
| 3,206,695 | 2/1965 | Bennett, Jr. | 331/113 A |
| 3,497,783 | 2/1970 | Toth et al. | 331/113 S |
| 3,539,905 | 11/1970 | Schwarz | 331/113 A X |
| 3,781,643 | 12/1973 | King | 331/113 S X |

FOREIGN PATENT DOCUMENTS

| | | | |
|---|---|---|---|
| 1204320 | 11/1965 | Fed. Rep. of Germany | 331/113 S |
| 2028034 | 6/1969 | Fed. Rep. of Germany | 363/139 |
| 0093418 | 6/1982 | Japan | 363/25 |
| 0128499 | 3/1959 | U.S.S.R. | 331/113 A |

*Primary Examiner*—James B. Mullins
*Assistant Examiner*—D. C. Mis
*Attorney, Agent, or Firm*—Kenneth E. Leeds; Alan H. MacPherson; Steven F. Caserza

[57] ABSTRACT

An inverter (100) receives a DC voltage and generates therefrom a square wave output signal. The inverter includes an output transformer (T3) and a saturable core transformer (T4). The saturable core transformer (T4) provides base current for a first transistor (Q3) and a second transistor (Q4). The first transistor (Q3) and the second transistor (Q4) alternatively turn on and off, causing a square wave to appear across the secondary winding of the output transformer (T3). The primary winding of the output transformer is coupled to the collectors of the first and second transistors via a pair of windings (L10, L11) magnetically coupled to the saturable transformer (T4). A pair of diodes (D4, D5) are provided to prevent the output leads of primary windings of the output transformer (T3) from dropping below ground potential. In addition, a pair of saturable inductive elements (118, 120) or diodes (D8, D9 or D10, D11) are coupled between the primary windings of the output transformer (T3) and the collector windings (L10, L11) of the saturable transformer (T4) to prevent a drop in the voltage at the primary windings of the output transformer from altering the volt seconds appearing across the saturable core transformer (T4).

16 Claims, 10 Drawing Figures

INVERTER USING CURRENT STEERING SATURABLE INDUCTORS OR DIODES

BACKGROUND OF THE INVENTION

1. Field of the Invention

This invention relates to square wave inverters which receive a DC voltage and generate therefrom a square wave AC output voltage.

2. Description of the Prior Art

Figure 1:
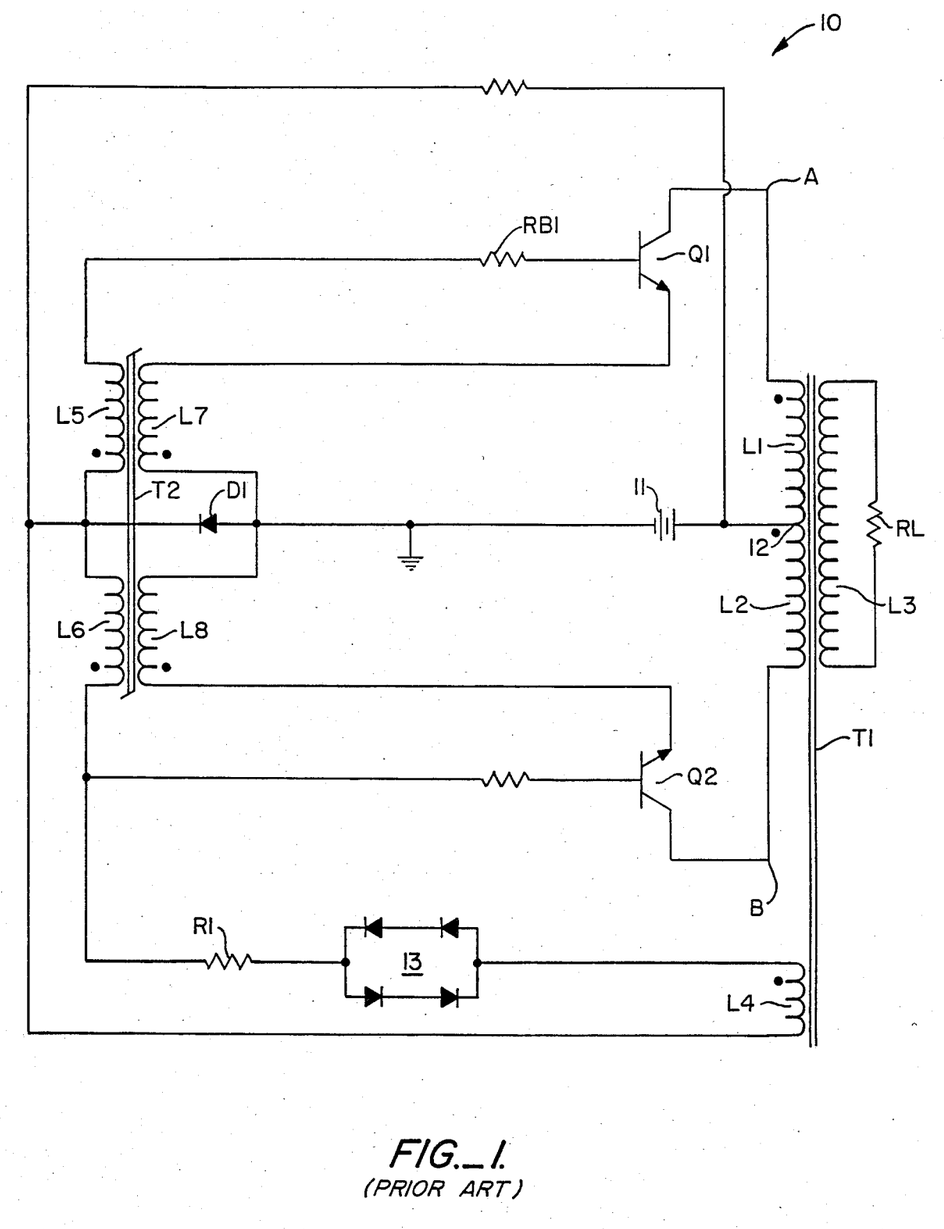
FIG. 1 is a schematic diagram of an inverter constructed in accordance with the prior art.

Inverter circuits, which convert DC input voltages to AC output voltages, are well known in the art. An example of such an inverter circuit is disclosed in U.S. Pat. No. 4,051,445 entitled "Inverter Converter Circuit for Maintaining Oscillations Throughout Extreme Load Variations", issued to Robert J. Boschert. This patent is hereby incorporated by reference. FIG. 1 illustrates a power supply in accordance with the prior art Boschert patent. Referring to FIG. 1, an inverter 10 includes an output transformer T1 and a saturable core transformer T2. A DC power source 11 is coupled to the center tap 12 of output transformer T1 which in turn is coupled to a winding L1 and a winding L2 of transformer T1. Winding L1 is connected to the collector of a transistor Q1, the emitter of which is coupled to ground through a winding L7 of saturable core transformer T2. When transistor Q1 is on, current flows out of power source 11, through winding L1, through transistor Q1, through winding L7, and to ground. Similarly, winding L2 of transformer T1 is coupled to the collector of a transistor Q2, the emitter of which is coupled to ground through a winding L8 of saturable core transformer T2. When transistor Q2 is on, current flows out of power source 22, through winding L2, through transistor Q2, through winding L8, and to ground.

During operation, transistor Q1 turns on while transistor Q2 is off, then transistor Q1 turns off and transistor Q2 turns on. In this way, a square wave is provided across the primary winding of transformer T1 and hence across the secondary winding L3 of transformer T1. Base drive current for transistors Q1 and Q2 are provided by windings L5 and L6, respectively, of saturable core transformer T2. Specifically, when transistor Q1 turns on, current through winding L7 causes current to flow through winding L5. The current through winding L5 provides base drive current for transistor Q1. When base drive current is flowing through winding L5, there is a voltage across winding L5 equal to the voltage across a resistor RB1, the voltage across the base emitter junction of transistor Q1, the voltage across winding L7, and the voltage across diode D1. As is well known in the art, when a voltage is placed across the winding of a saturable core transformer, the transformer eventually saturates, and the voltage across the winding drops to zero. When the voltage across winding L5 drops to zero, transistor Q1 turns off and the energy stored in transformer T2 causes current to flow through winding L6, turning transistor Q2 on. When transistor Q2 is on, the current flowing through winding L8 causes current to flow through winding L6, which provides continued base drive current for transistor Q2. In addition, a winding L4 magnetically coupled to output transformer T1 is coupled to winding L6 via a diode network 13 and a resistor R1. Winding L4 provides additional base drive current for transistors Q1 and Q2. Other features of this prior art power supply are explained in greater detail in the above-referenced Boschert patent.

Although the inverter shown in the '445 patent provides a square wave output across load resistor RL, under certain circumstances, inverter 10 exhibits various undesirable phenomena. For example, at the end of a switching interval, after transistor Q1 turns off, the voltage at the collector of transistor Q1 increases and the voltage present at the collector of transistor Q2 approaches ground. Because of the inductive nature of transformer T1, the voltage at the collector of transistor Q2 continues to fall, even below ground, until the current flowing into the base of transistor Q2 equals the magnetizing current drawn into transformer T1. When this condition exists, current flow across the base-collector junction of transistor Q2 causes the potential present at the base of transistor Q2 to drop as well. As the voltage at the base of transistor Q2 drops, because of the magnetic coupling between windings L6 and L5, the voltage at the base of transistor Q1 starts to rise. If it rises sufficiently for transistor Q1 to turn on, then the undesirable result of having transistor Q1 turn on with a large voltage across its collector and emitter will occur, potentially causing damage to transistor Q1. This condition may occur transiently or in a "ringing" fashion. In addition, this phenomenon occurs when transistor Q2 turns off and the voltage present at the collector of transistor Q1 falls below ground.

In addition, the frequency of inverter 10 depends in part on the time it takes for saturable core transformer T2 to go into saturation, which depends on the voltage appearing across windings L5 and L6. If the above-mentioned effect causes the voltage across windings L5 and L6 to be lower than normal during the beginning of each half-cycle, then the saturation time for transformr T2 will increase, causing the frequency of oscillation of inverter 10 to fall.

SUMMARY

In accordance with this invention an inverter having a saturable core transformer and an output transformer is provided. The collectors of a pair of transistors are connected to the leads of the primary winding of the output transformer, and the saturable core transformer provides base current to the transistors. The inverter includes circuitry such that the negative voltage excursions at the primary winding of the output transformer are limited. This is done by clamping the potential on the leads of the primary winding of the output transformer to a voltage no lower than ground minus one diode junction voltage drop. In this way, a path is provided for the magnetization current of the output transformer. Magnetizing current flows from ground, through a diode, and into the primary winding lead of the output transformer.

In addition, diodes are placed between the collectors of the transistors and the primary winding of the output transformer, preventing the output transformer from pulling magnetizing current out of the collectors. These diodes prevent the base of the transistors from being dragged low and distorting the voltage appearing across the windings of the saturable core transformer. In this way, negative voltage excursions across the primary windings of the output transformer will not be permitted to alter the oscillation frequency of the saturable core transformer.

In another embodiment, a saturable inductive element is placed between the collectors of the transistors and the primary winding of the output transformer instead of the diodes. These inductive elements also prevent the base of the transistors from being dragged low and distorting the voltage appearing across the saturable transformer. However, the saturable inductive elements have the added advantage of eliminating power loss across the diode junction, because they go into saturation before any appreciable current flows through them.

The above advantages are better understood with reference to the drawings and the detailed description following hereinafter.

DETAILED DESCRIPTION

Figure 2:
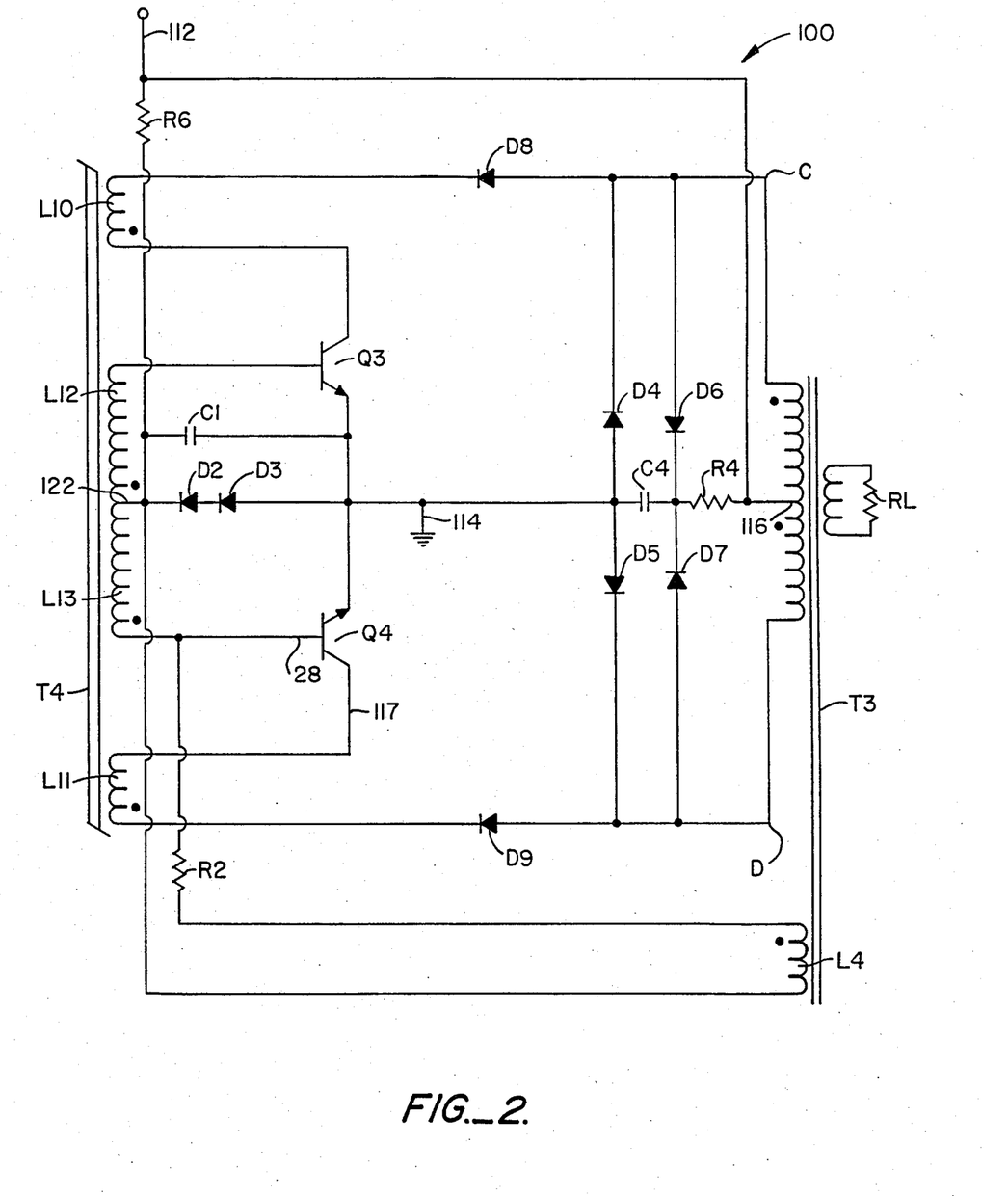
FIG. 2 is a schematic diagram of an inverter constructed in accordance with the present invention.

Referring to FIG. 2, an inverter 100 includes a terminal 112 which receives a DC voltage Vin relative to a ground terminal 114. Terminal 112 is coupled to a center tap 116 of the primary winding of an output transformer T3. The secondary winding of transformer T3 is coupled across a load indicated as $R_L$. The outer taps of the primary winding of transformer T3 are connected to a node C and a node D which in turn are coupled to a winding L10 and a winding L11, respectively, of a saturable core transformer T4. Windings L10 and L11 are coupled to the collectors of transistors Q3 and Q4 respectively. The emitters of transistors Q3 and Q4 are coupled to ground terminal 114. In operation, transistors Q3 and Q4 act as switches. When transistor Q3 is in the on state, current flows from terminal 112 through the primary winding of transformer T1 to node C, through winding L10, and through transistor Q3 to ground terminal 114. When that happens, transistor Q4 is off. When transistor Q3 turns off, current starts to flow from terminal 112, through the center tap of transformer T3, through the primary winding to node D, through winding L11, and through transistor Q4 to ground terminal 114. In this way, a square wave output is generated across the secondary windings of transformer T3. In a preferred embodiment, this square wave has a frequency between 20 KHZ and 33 KHZ.

Base current for turning on transistors Q3 and Q4 is provided by two sources. First, base current is provided by a winding L12 of transformer T4. Thus, when current is flowing through winding L10, current proportional to the turns ratio of transformer T4 is also provided by winding L12 which is magnetically coupled winding L10. The current produced by winding L12 flows through the base of transistor Q3, thus keeping transistor Q3 turned on. The voltage across winding L12 equals the voltage drop across the base-emitter junction of transistor Q3 plus the voltage drop across a diode D2 plus the voltage drop across a diode D3. As is well known in the art, when one places a constant voltage across the windings of a saturable core transformer, eventually that transformer goes into saturation. When that happens, the voltage across windings L12 drops to zero, transistor Q3 turns off and transistor Q4 turns on. When transistor Q4 turns on, current flows through winding L11, through the collector 117 of transistor Q4 and into terminal 114. In addition, current flows through a winding L13 of transformer T4. The current through winding L13 forms part of the base current for transistor Q4.

A winding L4, which is part of transformer T3, is another source of base current for transistors Q3 and Q4. It is seen that the base of a transistor Q4 is coupled to winding L4 via a resistor R2. Thus, the square wave voltage at transformer T3 is converted to a current by resistor R2, providing additional base current for transistor Q4. In addition, magnetically coupled windings L13 and L12 of transformer T4 comprise a 1:1 transformer steering current from resistor R2 into the base of transistor Q3 to provide additional base current for transistor Q3 during the half cycle that transistor Q3 is on. This mechanism is more fully described in U.S. Pat. No. 4,051,445, mentioned above.

Figure 3A:
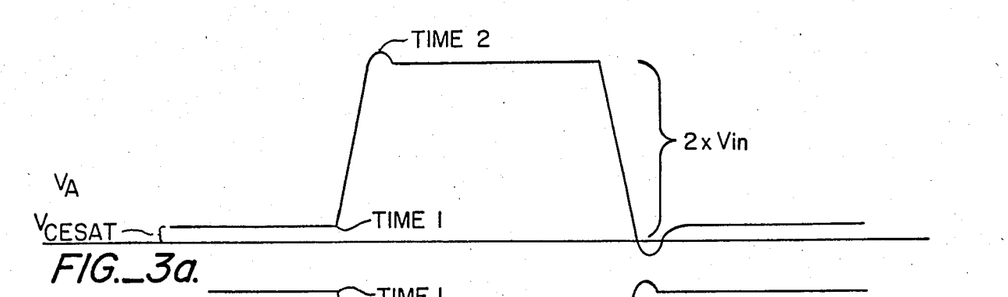
FIG. 3a is a waveform diagram of the voltage appearing at node C of FIG. 2.
Figure 3B:
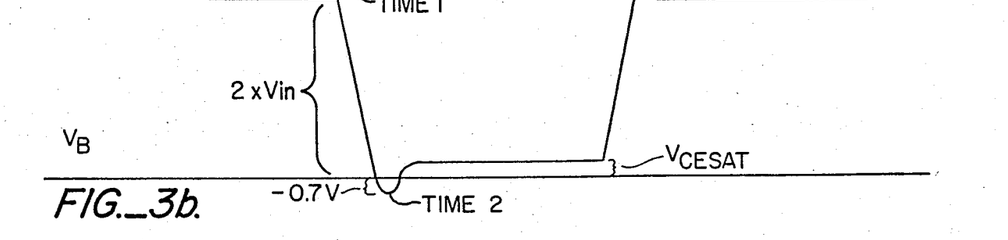
FIG. 3b is a waveform diagram of the voltage appearing at node D of FIG. 2.

At the instant that the transistor Q3 turns off, current stops flowing out of node C. When that happens, because of the inductive nature of transformer T3, the natural response of the transformer is to increase the voltage at node C. This is illustrated at point TIME 1 in the waveform illustrated in FIG. 3a. In addition, because of the magnetic coupling of transformer T3, the voltage at node D starts to drop. This causes the voltage at the collector of transistor Q4 to drop. In this condition, it is possible for current to flow from ground terminal 114, through diodes D2 and D3, through winding L13, and into the base of transistor Q4. In the absence of diodes D8 and D9, if the voltage at collector 117 of transistor Q4 drops low enough, transistor Q4 functions in an inverse mode with the emitter functioning as a collector, collector 117 functioning as an emitter, and current flowing from the base to collector 117. Thus, transistor Q4 could turn on, causing the voltage at the base of transistor Q4 (node 28) to drop. (The voltage at node 28 would equal the voltage at collector 117 plus the voltage drop across the base-collector junction, which is about 0.7 volts.) This in turn would cause the voltage present at the base of transistor Q3 to rise (because of the magnetic coupling of transformer T4), permitting transistor Q3 to turn on. This could have a disasterous result, since the voltage at node C has increased to over 2×Vin. Accordingly, to prevent transistor Q3 from turning on at that point in time (TIME 2 of FIG. 3b), it is known in the art to provide a diode such as a diode D5 between node D and ground terminal 114. This clamps the voltage at node D to a value of minus 0.7 volts, preventing the base of transistor Q4 from falling below zero volts (0 volts=ground minus the voltage drop across diode D5 plus the base-collector voltage drop of transistor Q4). As will be shown below, the center tap of transformer T4 stays at about −1.2 volts. With diode D5 in place, after the voltage at node D passes zero volts, the voltage at the base of transistor Q3 does not rise above −2.4 volts and transistor Q3 cannot turn on. A similar diode D4 coupled between ground and node C prevent the same phenomenon from happening to transistor Q3 after transistor Q4 turns off.

After transistor Q3 turns off, as collector 117 of transistor Q4 approaches ground, the voltage present at the base of transistor Q4 rises to +0.7 volts. If the voltage at the collector of transistor Q4 falls to one diode voltage drop below ground, or −0.7 volts (which occurs when the magnetization current into node C exceeds the available base current), then the voltage at the base of transistor Q4 will be pulled down to zero volts. Because the period of oscillation of saturable transformer T4 depends upon the volt seconds appearing across windings L12 and L13, such a drop of voltage would lengthen the period of oscillation for inverter 100. Therefore, in accordance with a novel feature of this invention, in addition to diodes D4 and D5, a new diode D8 is coupled between node C and winding L10 and a new diode D9 is coupled between node D and winding L11. Diode D9 prevents transformer T3 from causing transistor Q4 to operate in the inverse mode. Specifically, by blocking any flow of magnetizing current into transformer T3 from collector 117 (by causing diode D5 to provide the current into transformer T3), diode D9 prevents the perturbation of the base potential of transistor Q4. However, when transistor Q4 operates in the forward mode, current is permitted to flow from transformer T3, through diode D9, through winding L11, and through transistor Q4. Diode D8 performs the same function for transistor Q3.

It is seen that in inverter 100, a diode D6 and a resistor R4 are coupled in series across node C and center tap 116. This clips overshoot and ringing due to the inductance of transformer T3. When transistor Q3 switches off, the voltage at node C begins to rise. When the voltage at node C passes Vin+0.7 volts, diode D6 turns on, permitting current to flow through diode D6 and resistor R4. Resistor R4 and capacitor C2 then clamp overshoot during the positive voltage excursion at node C. A diode D7 is similarly situated between node D and resistor R4, and serves the same purpose when transistor Q4 switches off.

In inverter 100, diodes D2 and D3 are coupled in series between ground and the center tap of transformer T4. During operation, the center tap of transformer is thus biased to a voltage of about −1.2 volts. This has several advantages. One advantage is improved frequency stability. If the base-emitter voltages of transistors Q3 and Q4 are not matched, the duty cycle of the inverter is affected. Obviously, without diodes D2 and D3, the entire source of volt-seconds which drive transformer T4 into saturation would be the base-emitter voltage drops of transistors Q3 and Q4. If they were, for example, 0.68 volts and 0.72 volts, respectively, the voltage appearing across winding L12 when transistor Q3 is on would be 94% of the voltage across winding L13 when transistor Q4 is on. With diodes D2 and D3 in place, if the diode voltage drop equals 0.6 volts, then when transistor Q3 is on, the voltage appearing across winding L12 is 1.88 volts, and when transistor Q4 is on, the voltage appearing across winding L13 is 1.92 volts. Therefore, the 0.04 volt mismatch represents a much smaller percentage of the voltage that drives transformer T4 into saturation. Diodes D2 and D3 also provide greater noise immunity for the inverter.

Figure 3C:
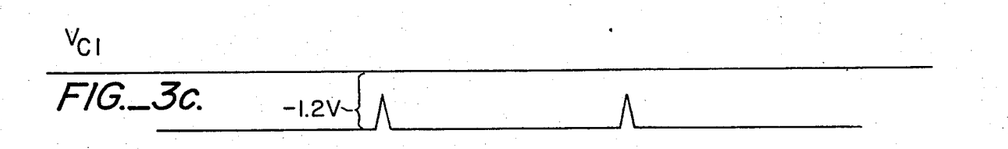
FIG. 3c is a waveform diagram of the voltage appearing across capacitor C1 of FIG. 2.
Figure 3D:
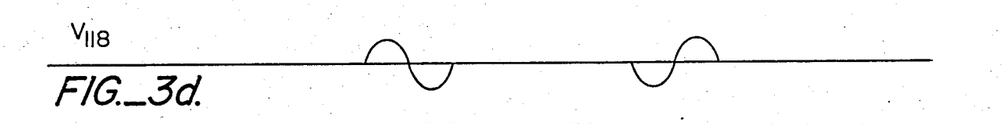
FIG. 3d is a waveform diagram of the voltage appearing across saturable inductor 118 in FIG. 5.

Capacitor C1 maintains the voltage drop across bias diodes D2 and D3 during the inverter switching interval to prevent the center tap of transformer T2 from drifting with respect to ground. If capacitor C1 were not present at the time when transistor Q3 turns off and current ceases to flow through diodes D2 and D3, the center tap 122 of transformer T4 could jump to a positive voltage. Since the voltage across windings L12 and L13 has collapsed (due to the saturation of transformer T4), if the voltage at tap 122 increases, the base voltage at transistors Q3 and Q4 also increases. If the base voltages rise sufficiently to turn both transistors Q3 and Q4 on, this effectively ties nodes C an D to ground—clearly an undesirable result. Accordingly, it is known in the art to provide a capacitor such as capacitor C1 coupled across diodes D2 and D3 which maintains the voltage at tap 122 below ground until current starts flowing through diodes D2 and D3. FIG. 3c illustrates the voltage across capacitor C1.

The components of FIG. 2 have the following part numbers and values:

| COMPONENT | PART NUMBER | MANUFACTURER |
|---|---|---|
| Diodes D2 and D3 | MR750 | Motorola |
| Diodes D4, D5, D6 and D7 | BYW95C | Phillips |
| Transistors Q3 and Q4 | BUW13 | Phillips |
| Core of Transformer T4 | W41003TC | Magnetics, Inc. |

| PART | VALUE |
|---|---|
| Resistor R4 | 22K ohms, 5 watts |
| Capacitor C4 | .01 μF 400 volts |
| Resistor R6 | 27K ohms, 2 watts |
| Capacitor C1 | the parallel combination of three 50 volt, 1 μF film dielectric capacitors |

In a preferred embodiment, the DC voltage applied to terminal 112 is between 90 volts and 160 volts. Also in a preferred embodiment windings L10 and L11 each have one turn, and windings L12 and L13 each have seven turns. The winding between tap 116 and node C have 26 turns, and the winding between tap 116 and node D has 26 turns. Winding L4 has three turns.

Figure 4:
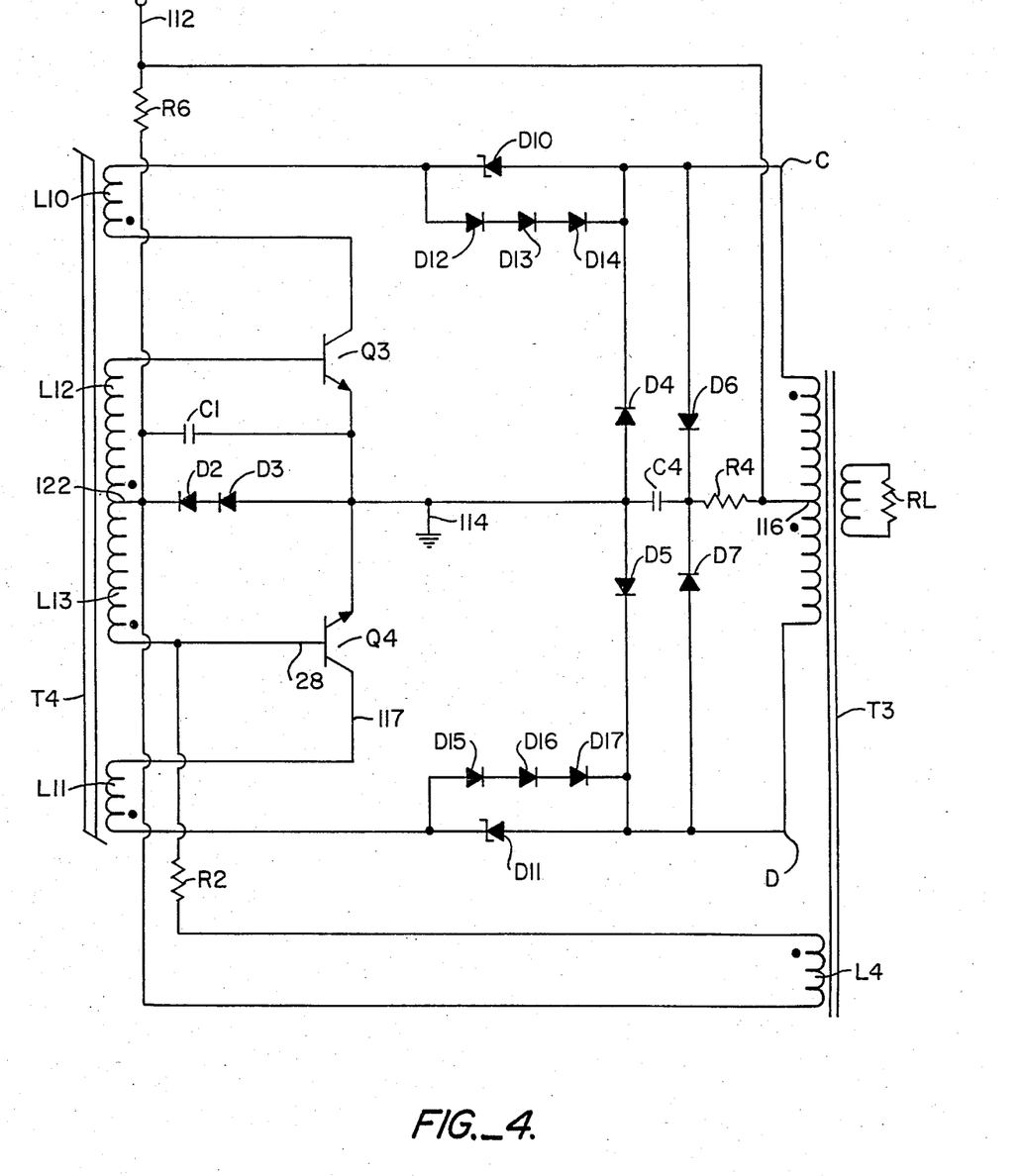
FIG. 4 is a schematic diagram of an inverter circuit using a Schottky diode in parallel with the series connection of three silicon diodes in place of diodes D7 and D8 in FIG. 2.

Diodes D8 and D9 of FIG. 2 are silicon diodes capable of withstanding high reverse voltages (approximately 400 volts). The forward voltage drop across diodes D8 and D9 is approximately 1 volt. Because of these constraints, the heat dissipation and power loss through diodes D8 and D9 are considerable. Accordingly, FIG. 4 illustrates an improved circuit using a Schottky diode D10 in place of diode D8 and a Schottky diode D11 in place of diode D9. Schottky diodes typically have forward bias voltage drops of approximately 0.4 volts so that the power dissipation loss through diodes D10 and D11 will be considerably less than the dissipation loss in diodes D8 and D9. Also illustrated in FIG. 4 are a set of diodes D12, D13 and D14 coupled in series across diode D10. Similarly, a set of diodes D15, D16 and D17 are coupled in series across diode D11. Because of the presence of diodes D12, D13 and D14, a large reverse voltage will never appear across diode D10. Similarly, because of the presence of diodes D15, D16 and D17, a large reverse bias will never occur across diode D11. This is important because it is difficult to obtain Schottky diodes capable of withstanding large reverse bias voltages without being damaged.

Figure 5:
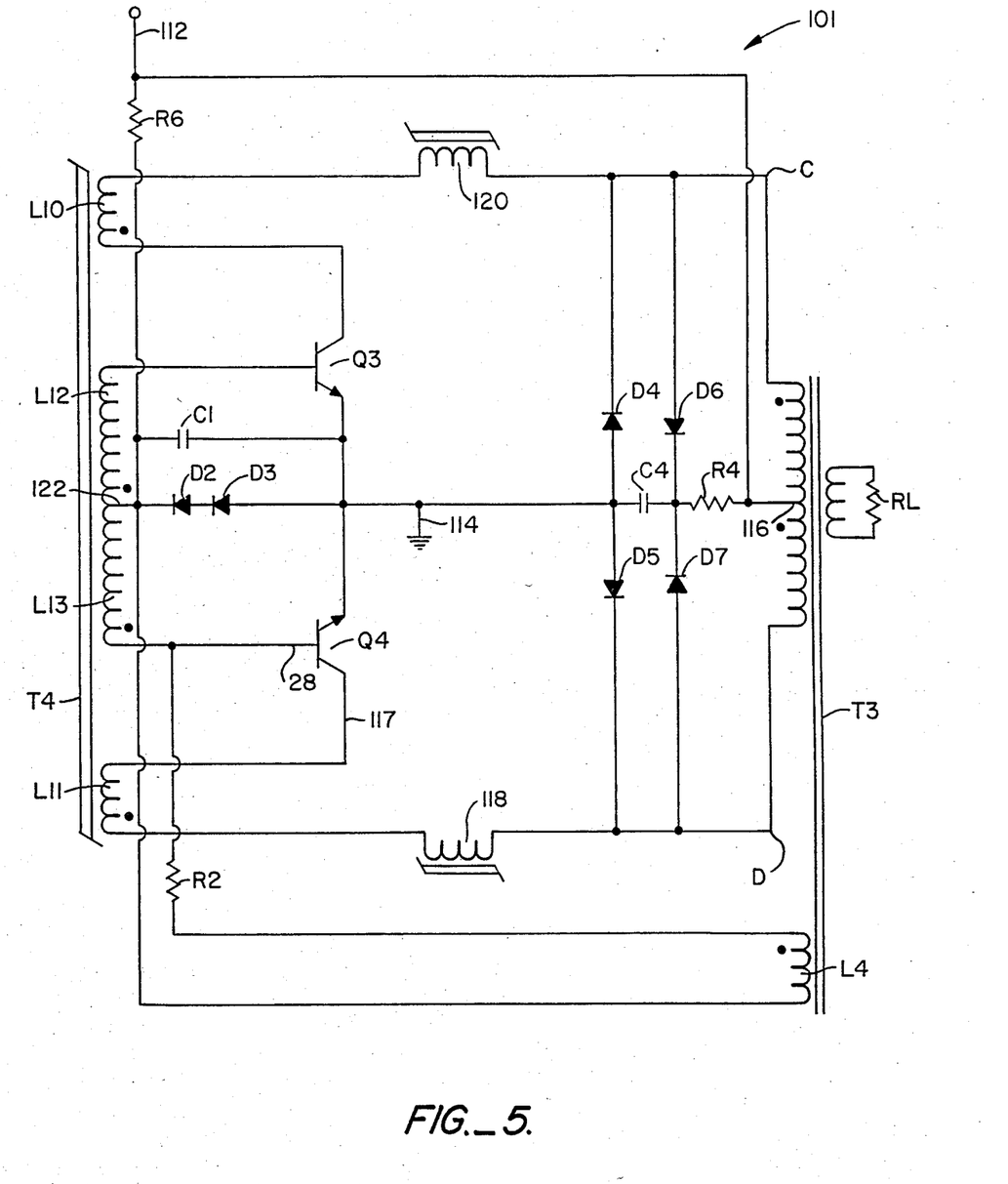
FIG. 5 is a schematic diagram of an inverter circuit using a saturable core inductor in place of the diodes D7 and D8 of FIG. 2.

FIG. 5 is a schematic diagram of an inverter 101 constructed in accordance with a third embodiment of the invention. Inverter 101 includes a saturable inductor 118 provided between node D and winding L11 in place of diode D9. As is well known in the art, the current through an inductor is the integral of the voltage appearing across it. When transistor Q3 turns off, transistor Q4 turns on, and node D drops to −0.7 volts (TIME 2, FIG. 3b), and the magnetizing current of transformer T3 is pulled from node D. Some of the magnetizing current flows from diode D5, and some current flows from inductor 118. It is desirable to have almost all of the magnetizing current flow from diode D5. The factors governing how much of the current flows from diode D5 and how much flows from inductor 118 are:

1. Diode D5 limits the voltage across inductor 118 to 0.7 volts;
2. The inductance of inductor 118 determines the rate of current increase for a given voltage across it.

Accordingly, since the voltage across inductor 118 is small, it can be seen that optimally inductor 118 should have high inductance and low volt-second capacity—a relatively small, inexpensive device.

The current flowing from inductor 118 is effectively base drive current diverted from the base-emitter junction of transistor Q4. As long as the base-emitter junction of transistor Q4 is always forward biased during the half cycle, winding L13 will be at the proper voltage insuring proper switching frequency for inverter 101. Therefore, inductor 118 should be selected so as to insure that some of the base drive current through transistor Q4 flows across the base-emitter junction when diode D5 is conducting, i.e., inductor 118 limits the peak reverse collector current to a value less than the base current. When the voltage at node D starts increasing, diode D5 stops conducting, and the current flowing through winding L11 reverses direction and flows into collector 117 of transistor Q4, and into ground terminal 114. When this happens, inductor 118 saturates rapidly and exhibits nearly zero impedance. When inductor 118 is saturated, the voltage across it is essentially zero, and it no longer alters the operation of inverter 101. It does not consume power and reduce the efficiency of the inverter (like diodes D8–D17). Finally, because inductor 118 eliminates 4 diodes (D15, D16, D17, and D11), use of inductor 118 reduces the parts count.

Of importance, when transistor Q4 turns on, the voltage present at terminal 112, which in one embodiment can be approximately 140 volts, causes inductor 118 to saturate almost immediately, whereas the 0.7 volts applied across inductor 118 when diode D5 conducts would not. Also of importance is the fact that inductor 118 never stores a great deal of energy. Accordingly, when transistor Q4 turns off, only a small inductive voltage spike will appear across inductor 118.

Inductor 118 has five turns around a core such as part number J40603TC, available from Magnetics, Inc. An inductor 120 which is identical to inductor 118 is provided between winding L10 and node C to serve the same function as inductor 118 for transistor Q3.

Figure 6:
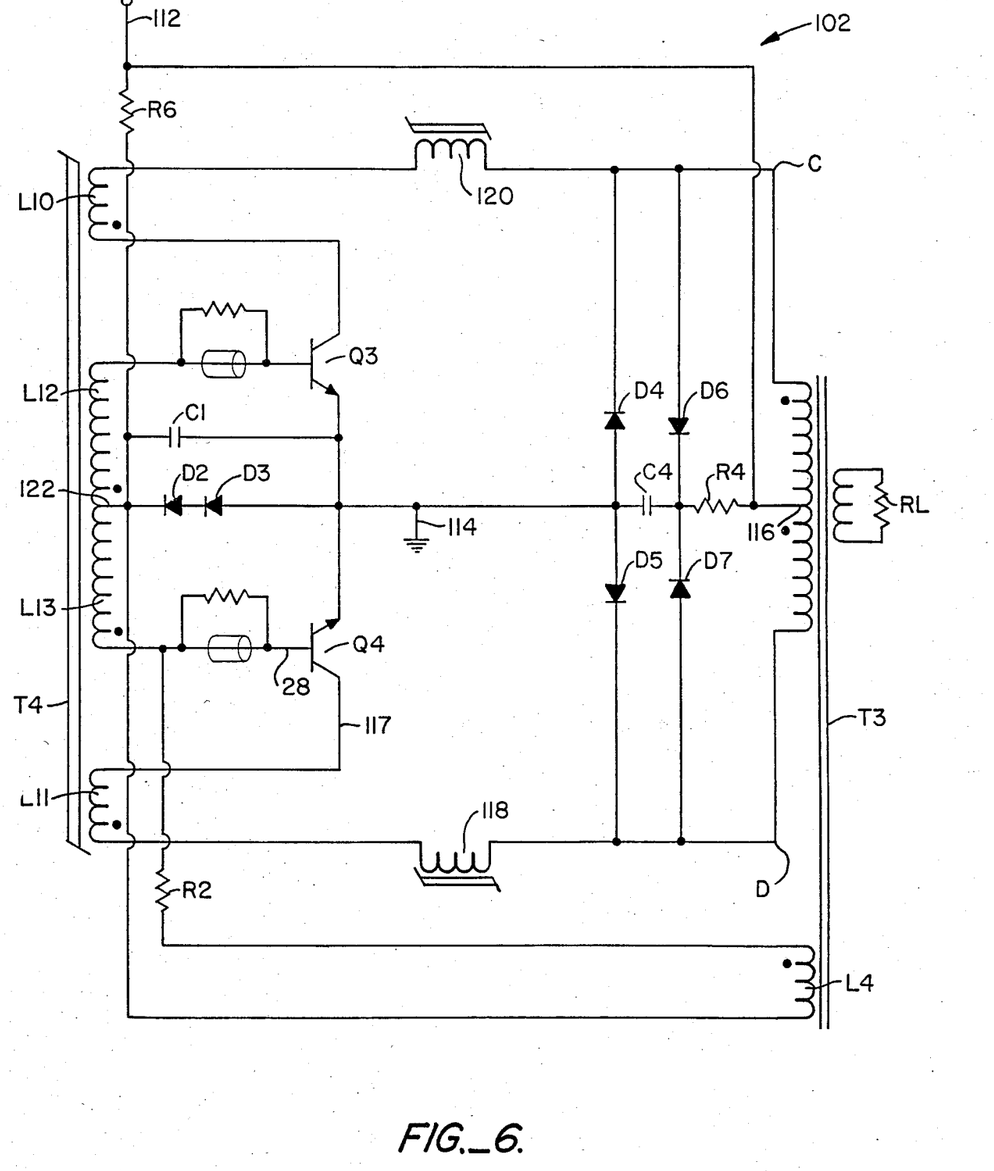
FIG. 6 is a schematic diagram of an inverter utilizing a parallel combination resistor-ferrite bead input circuit coupled to the base of the power transistors Q3 and Q4.

FIG. 6 is an illustration of an inverter 102 constructed in accordance with another embodiment of the invention. The circuit of FIG. 6 includes a resistor and a ferrite bead coupled in parallel between transformer T4 and the bases of transistors Q3 and Q4. As well understood in the art, this means of shaping base current is sometimes desirable to get a faster turn-off in the collector current when transistors Q3 and Q4 are to turn off. In other situations, the ferrite bead-resistor input is not desirable.

Figure 7:
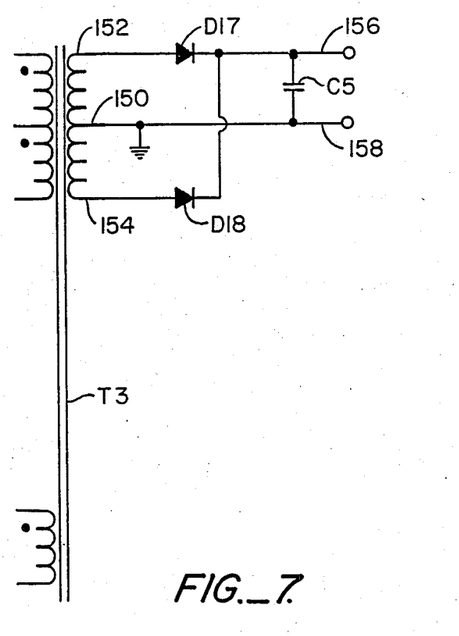
FIG. 7 is a schematic diagram of an alternative output stage for the inverter of FIG. 2.

Referring to FIG. 7 an alternative output stage is illustrated for the inverter. The secondary winding of transformer T3 has a center tap 150 coupled to ground and a pair of outer taps 152 and 154. Tap 152 is coupled to an output terminal 156 via a diode D17. Similarly, tap 154 is coupled to terminal 156 via a diode D18. A capacitor C5 is coupled between terminal 156 and a ground terminal 158. Accordingly, in the embodiment of FIG. 7, the inverter circuit is configured to provide a DC voltage across terminals 156 and 158.

While the invention has been disclosed with reference to a specific embodiment, those skilled in the art will recognize and appreciate that minor modifications could be made without departing from the spirit and scope of the invention. For example, PNP transistors could be used instead of NPN transistors. (The voltage polarities and diode directions would be reversed in such an embodiment.) Accordingly, all such changes come within the spirit and scope of the invention as delineated by the following claims.

We claim:

1. An inverter comprising:
   an output transformer having a primary winding, said primary winding having a first primary winding lead, a second primary winding lead, and a center tap;
   a first transistor having a collector coupled to said first primary winding lead, said first transistor having a base and an emitter;
   a second transistor having a collector coupled to said second primary winding lead, said second transistor having a base and an emitter;
   means for providing base drive current for said first transistor;
   means for providing base drive current for said second transistor; and
   limit means for limiting the collector current of the first transistor, said limit means preventing excessive collector current from preventing current from flowing across said base-emitter junction of said first transistor.

2. The inverter of claim 1 wherein said first and second transistors are NPN transistors.

3. The inverter of claim 1 wherein said first and second transistors are PNP transistors.

4. The inverter of claim 1 wherein said limit means comprises a diode coupled between said first primary winding lead and the collector of said first transistor.

5. The inverter of claim 1 wherein said limit means is a saturable inductor.

6. The inverter of claim 1 wherein the emitters of said first and second transistors are coupled to receive a first reference voltage and said center tap is coupled to receive a second reference voltage.

7. A circuit comprising:
   direct current (DC) means for providing a voltage across a first terminal and a second terminal;
   an output transformer having a primary winding and a secondary winding, said primary winding having a center tap coupled to said first terminal, said primary winding having a first primary winding output lead and a second primary winding output lead;

a first transistor having a collector coupled to said first primary winding output lead and an emitter coupled to said second terminal;

a second transistor having an emitter coupled to said second terminal and a collector coupled to said second primary winding output lead;

a second transformer having a saturable core, said second transformer having a center tap electrically coupled to the emitters of said first and second transistors, said second transformer having a first output lead coupled to the base of said first transistor, said second transformer having a second output lead coupled to the base of said second transistor, said second transformer alternately providing base current for said first transistor and then for said second transistor;

a first diode coupled between said second terminal and said first primary winding output lead, said first diode clamping the voltage present at said first primary winding output lead to a voltage above the voltage present at said second terminal minus one diode voltage drop;

a second diode coupled between said second terminal and said second primary winding output lead, said second diode clamping the voltage present at said second primary winding output lead to a value above the voltage present at said second terminal minus one diode voltage drop;

first means for preventing a drop in the voltage present at said first primary winding output lead from pulling the collector voltage of said first transistor below the voltage at said second terminal; and second means for preventing a drop in the voltage present at said second primary winding output lead from pulling the collector voltage of said second transistor below the voltage at said second terminal.

8. The circuit of claim 7 wherein said first means comprises a third diode coupled between the collector of said first transistor and said first primary winding output lead, and said second means comprises a fourth diode coupled between the collector of said second transistor and said second primary winding output lead.

9. A circuit comprising:

direct current (DC) means for providing a voltage across a first terminal and a second terminal;

an output transformer having a primary winding and a secondary winding, said primary winding having a center tap coupled to said first terminal, said primary winding having a first primary winding output lead and a second primary winding output lead;

a first transistor having a collector coupled to said first primary winding output lead and an emitter coupled to said second terminal;

a second transistor having an emitter coupled to said second terminal and a collector coupled to said second primary winding output lead;

a second transformer having a saturable core, said second transformer having a center tap electrically coupled to the emitters of said first and second transistors, said second transformer having a first output lead coupled to the base of said first transistor, said second transformer having a second output lead coupled to the base of said second transistor, said second transformer alternately providing base current for said first transistor and then for said second transistor;

a first diode coupled between said second terminal and said first primary winding output lead, said first diode clamping the voltage present at said first primary winding output lead to a voltage above the voltage present at said second terminal minus one diode voltage drop;

a second diode coupled between said second terminal and said second primary winding output lead, said second diode clamping the voltage present at said second primary winding output lead to a value above the voltage present at said second terminal minus one diode voltage drop;

first means for mitigating the effect of a voltage drop at said first primary winding output lead on the collector voltage of said first transistor such that said voltage drop at said first primary winding output lead does not cause a voltage drop of equal magnitude at the collector of said first transistor; and second means for mitigating the effect of a voltage drop at said second primary winding output lead on the collector voltage of said second transistor such that said voltage drop at said second primary winding output lead does not cause a voltage drop of equal magnitude at the collector of said second transistor.

10. The circuit of claim 9 wherein said first means comprises a third diode coupled between said first primary winding output lead and the collector of said first transistor and said second means comprises a fourth diode coupled between the collector of said second transistor and said second primary winding output lead.

11. The circuit of claim 10 wherein said first means also comprises the series combination of a plurality of diodes coupled in parallel across said third diode, the diodes within said plurality of diodes being oriented in a direction opposite that of said third diode.

12. The circuit of claim 11 wherein said third diode and said fourth diode are both Schottky diodes.

13. A circuit comprising:

direct current (DC) means for providing a voltage across a first terminal and a second terminal;

an output transformer having a primary winding and a secondary winding, said primary winding having a center tap coupled to said first terminal, said primary winding having a first output lead and a second output lead;

a first transistor having a collector coupled to said first output lead of said primary winding and an emitter coupled to said second terminal;

a second transistor having an emitter coupled to said second terminal and a collector coupled to said second output lead of said primary winding;

a second transformer having a saturable core, said second transformer having a center tap electrically coupled to the emitters of said first and second transistors, said second transformer having a first output lead coupled to the base of said first transistor, said second transformer having a second output lead coupled to the base of said second transistor, said second transformer alternately providing base current for said first transistor and then for said second transistor;

a first saturable inductive element coupled between said first output lead of said primary winding and the collector of said first transistor, said first saturable inductive element limiting the effect of a drop in the voltage potential at said first output lead of said primary winding on the volt seconds appearing across said second transformer; and a second saturable inductive element coupled between said second output lead of said primary winding and the collector of said second transistor, said second inductive element limiting the effect of a drop in voltage potential at said second output lead of said primary winding on the volt seconds across said second transformer.

14. The circuit of claim 13 further comprising:

a first diode coupled between said second terminal and said first output lead of said primary winding; and a second diode coupled between said second terminal and said second output lead of said primary windings 15. The circuit of claim 14 further comprising:

a resistor and capacitor coupled in series between said center tap of said output transformer and said second terminal;

a third diode coupled between said first output lead of said primary winding and the node between said resistor and said capacitor, said resistor and capacitor filtering noise present at said first output lead of said primary winding when the voltage present at said first output lead of said primary winding rises above the voltage present at said first terminal; and a fourth diode coupled between said second output lead of said primary winding and said node between said resistor and said capacitor, said resistor and capacitor filtering noise present at said second output lead of said primary winding when the potential on said second output lead of said primary winding rises above the voltage potential at said first terminal.

16. The circuit of claim 13 wherein said second transformer further comprises:

a first additional winding coupled between said first saturable element and the collector of said first transistor; and a second additional winding coupled between said second saturable element and the collector of said second transistor.

* * * * *

UNITED STATES PATENT AND TRADEMARK OFFICE
CERTIFICATE OF CORRECTION

PATENT NO. : 4,603,307

DATED : July 29, 1986

INVENTOR(S) : William C. Voight et al

It is certified that error appears in the above-identified patent and that said Letters Patent is hereby corrected as shown below:

Column 8, line 42, "current of the" should read -- current of said --.

Column 8, line 45 delete "said" and insert -- the --.

Signed and Sealed this

Sixth Day of January, 1987

Attest:

DONALD J. QUIGG

Attesting Officer

Commissioner of Patents and Trademarks